United States Patent [19]

Stephenson

[11] Patent Number: 4,710,781

[45] Date of Patent: Dec. 1, 1987

[54] THERMAL PRINTER COLOR DYE FRAME IDENTIFICATION USING RED AND YELLOW LIGHT SOURCES

[75] Inventor: Stanley W. Stephenson, Spencerport, N.Y.

[73] Assignee: Eastman Kodak Company, Rochester, N.Y.

[21] Appl. No.: 892,620

[22] Filed: Aug. 4, 1986

[51] Int. Cl.[4] .......................... G01D 15/10; B41J 3/20

[52] U.S. Cl. ............................... 346/76 PH; 346/106; 400/120; 400/240.3; 400/248.3; 400/240.4

[58] Field of Search .......................... 346/136, 76 PH; 400/120, 240, 240.3, 204.4, 241, 241.2, 248.3, 249

[56] References Cited

U.S. PATENT DOCUMENTS 3,690,772 9/1972 Endl .................................. 356/179
3,910,701 10/1975 Henderson et al. .................. 356/39
4,505,603 3/1985 Yana .................................... 400/120
4,517,591 5/1985 Nagashima et al. ............. 358/75 X
4,551,729 11/1985 Kubo et al. .......................... 346/1.1
4,573,059 2/1986 Shinma et al. ................. 346/76 PH
4,588,316 5/1986 Everett, Jr. ........................ 400/248

*Primary Examiner*—E. A. Goldberg
*Assistant Examiner*—Gerald E. Preston
*Attorney, Agent, or Firm*—Raymond L. Owens

[57] ABSTRACT

In a thermal printer for printing color images which uses a carrier having a repeating series of spaced frames of yellow, magenta and cyan colored heat transferable dyes, apparatus for identifying the different color frames of each series uses a source of red light and a source of yellow light. The apparatus responds to the intensity of red and yellow source light which passes through a dye frame to identify that dye frame.

3 Claims, 6 Drawing Figures

THERMAL PRINTER COLOR DYE FRAME IDENTIFICATION USING RED AND YELLOW LIGHT SOURCES

CROSS-REFERENCE TO RELATED APPLICATION

Reference is made to commonly assigned U.S. patent application Ser. No. 851,748 filed Apr. 14, 1984 entitled "Identifying Color Dye Frames in Carrier Used in Thermal Printer" by S. J. Sparer and S. W. Stephenson.

FIELD OF THE INVENTION

The present invention relates to thermal printers for printing color images which uses a carrier having a repeating series of spaced frames of different colored heat transferable dyes. More particularly, this invention relates to identifying the different color frames of each series.

BACKGROUND OF THE INVENTION

In one type of thermal printer which prints colored images, a carrier contains a repeating series of spaced frames of different colored heat transferable dyes. In such apparatus, the carrier is disposed between a receiver, such as coated paper, and a print head formed of, for example, a plurality of individual heating elements. When a particular heating element is energized, it is heated and causes dye from the carrier to transfer to the receiver. The density or darkness of the printed color dye is a function of the energy delivered from the heating element to the carrier.

Thermal dye transfer printers offer the advantage of true "continuous tone" dye density transfer. This result is obtained by varying the energy applied to each heating element, yielding a variable dye density image pixel on the receiver.

The carrier often includes a repeating series of spaced yellow, magenta and cyan dye frames. First, the yellow frame and the receiver are moved to be positioned under the print head and as they are advanced, the heating elements are selectively energized to form a row of yellow image pixels in the receiver. This process is repeated until a yellow dye image is formed in the receiver. Next, the magenta frame is moved under the print head and the receiver is also moved under the print head. Both the receiver and the magenta frame are moved as the heating elements are selectively energized and a magenta image is formed superimposed upon the yellow image. Finally, as the cyan dye frame and the receiver are moved under the print head, the heating elements are selectively energized and a cyan dye image is formed in the receiver superimposed upon the yellow and magenta dye images. These yellow, magenta and cyan dye images combine to form a colored image.

Since the carrier has a repeating series of yellow, magenta and cyan dye frames, it is important to identify the leading yellow frame of each series. One way to identify the leading yellow frame is to employ a conventional sensitometer. This sensitometer identifies a yellow dye frame by producing a particular analog signal in response to light which passes a yellow dye frame. Such sensitometer is effective but can be a complex and expensive piece of equipment. Another way to identify a yellow dye frame is to provide code marks. A code field composed of a series of black code bars can be disposed in the clear interframe area between dye frames. This code field can identify the particular color of the following frame. A reader station can be provided which includes a plurality of photodetectors which are aligned to produce a particular output signal representing the color of the following colored frame. Such a system can perform quite satisfactorily but requires decoding electronics and involves additional manufacturing steps for forming the code field in the clear interframe areas of the carrier.

SUMMARY OF THE INVENTION

Accordingly, it is an object of this invention to provide an improved system for identifying the dye frames of a repeating series of dye frames on a carrier as it is used in a thermal printer.

This object is achieved in a thermal printer system including a printer which uses a carrier with a repeating series of spaced yellow, magenta and cyan dye frames and a receiver which receives dye from the yellow, magenta and cyan dye frames of a series to form a colored image, such printer including a print head having a plurality of selectively energizable heating elements, means for moving the carrier and the receiver along respective paths so as to sequentially move each dye frame of a series and the receiver relative to the print head such that as the heating elements are selectively energized, dye from each dye frame of a series is transferred to the receiver and forms a colored image in the receiver, means for identifying the dye frames of such series comprising:

(a) a source of red light disposed adjacent to the carrier path for illuminating the carrier with red light;

(b) a source of yellow light disposed adjacent to the carrier path for illuminating the same dye frame of the carrier illuminated by red light;

(c) first and second spaced photodetectors disposed adjacent to the carrier path and respectively responsive to the intensity of yellow and red source light which passes through the dye frames for respectively providing electrical signals, the levels of such signals being a function of the intensity of source light which passes through a dye frame;

(d) said first photodetector producing a signal level above a threshold level when illuminated by yellow source light passing through a yellow dye frame and below such threshold level when illuminated by yellow source light passing through a cyan or a magenta dye frame, said second photodetector producing a signal level above the threshold level when illuminated by red source light passing through a yellow or a magenta dye frame and below such threshold level when illuminated by red source light passing through a cyan dye frame; and (e) means responsive to the threshold levels of such first and second photodetector electrical signals for identifying the particular dye frame being illuminated by the red and yellow light sources.

In one space-saving embodiment, the red and yellow LEDs illuminate the same portion of each dye frame adjacent to the edge of the carrier.

Commercially available low cost, long life, LED light sources and low cost, long life, photodetectors can be employed in this invention. In accordance with the invention the identification of dye frames can be accomplished quite simply.

Another advantage of this invention is that no clear interframe area between carrier dye frames need be employed.

DESCRIPTION OF THE PREFERRED EMBODIMENT

Figure 1:
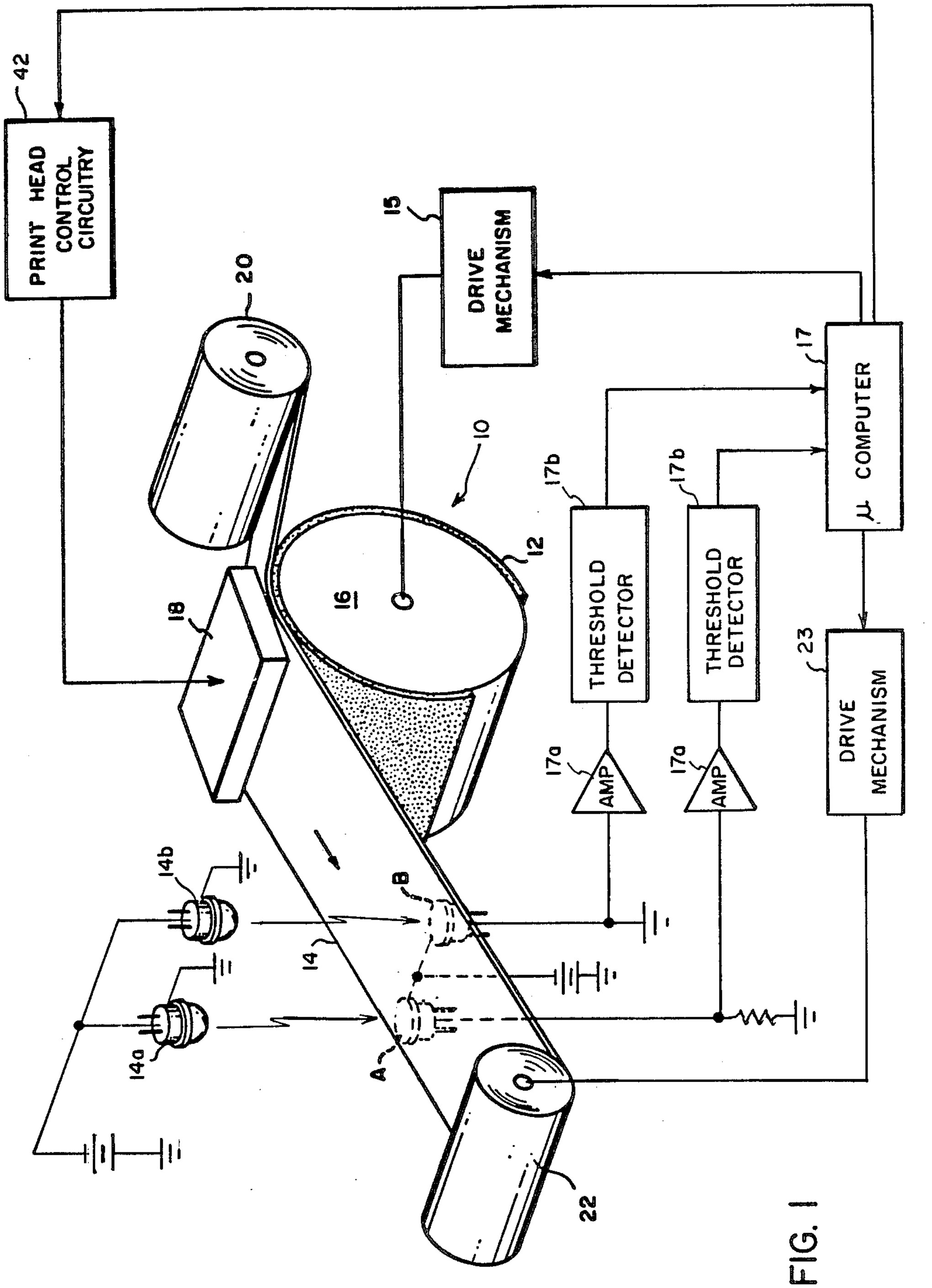
FIG. 1 is a schematic of a thermal printer apparatus which can be employed to make colored image in a receiver in accordance with the invention.
Figure 3A:
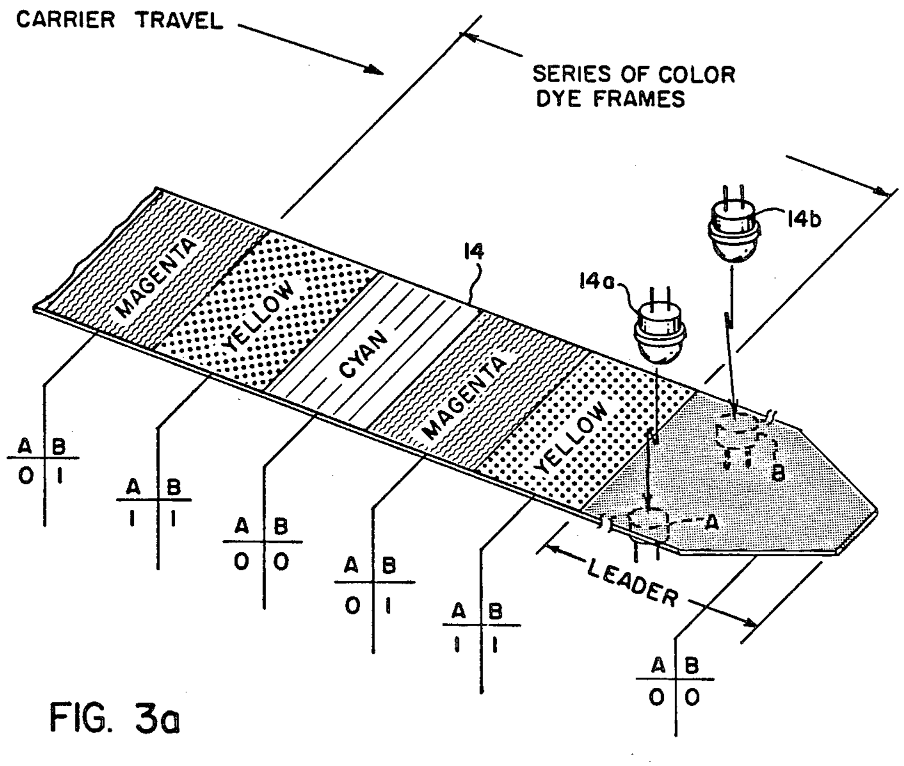
FIG. 3*a* shows a strip of a typical carrier which can be used by the apparatus shown in FIG. 1, and logic tables for the photodetectors A and B which are used by a microcomputer to identify the different colored dye frames of a repeating series of dye frames in the carrier.

To facilitate an understanding of the present invention, reference is first made to FIG. 3*a* which shows a typical section of a strip of a carrier 14 which may be used in the printer 10 shown in FIG. 1. The carrier 14 comprises a black leader portion followed by a repeating series of colored dye frames. The dye frames are contiguous and each series includes in sequence yellow, magenta and cyan dye frames. Each dye frame extends across the width of the carrier 14. As will be described later, an LED 14*a* produces yellow light and an LED 14*b* produces red light. Light from these sources illuminates the same dye frame. Located in the printer 10 and shown schematically in FIG. 3*a* is a reader station which includes the LEDs 14*a* and 14*b* and two spaced photodetectors A and B respectively. The LED 14*a* and photodetector A are disposed adjacent to one edge of the carrier 14 and the LED 14*b* and photodetector B are disposed adjacent to the opposite edge of the carrier 14. LEDs 14*a* and 14*b* can be constructed of Gallium-Arsenide-Phosphide. These elements are located downstream of the thermal print head 18. (See FIG. 1). They scan areas of the carrier 14 which are outside of the area contacted by thermal elements of the print head 18. These photodetectors A and B are adapted to provide signals, the amplitude levels of which are a function of the intensity of light from a corresponding LED light source which passes through a dye frame. These signals are used to identify the particular color of each dye frame. Yellow light produced by LED 14*a* can only illuminate the photodetector A. Red light produced by the LED 14*b* can only illuminate the photodetector B.

Figure 3C:
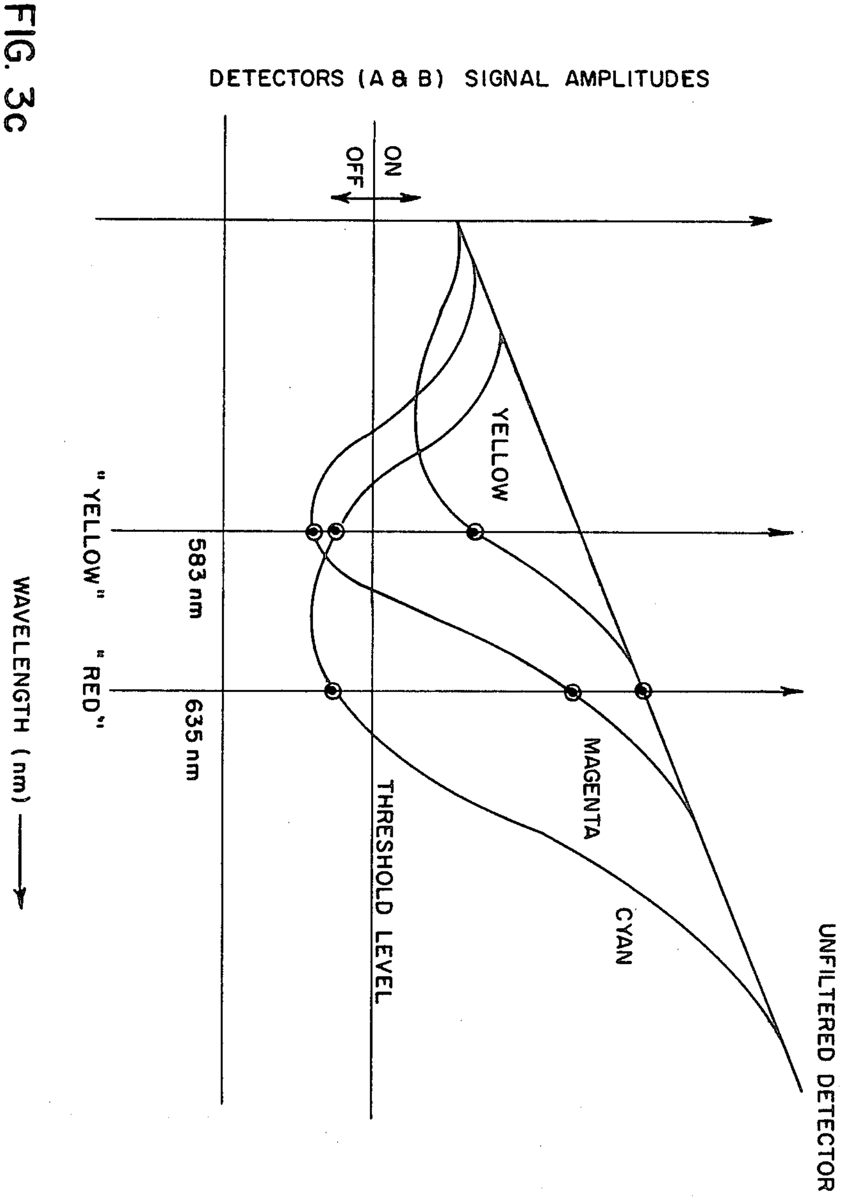
FIG. 3*c* is a graph illustrating representative spectral sensitivity of the dye frames of the carrier of FIG. 3*b* and the amplitude of the signals produced by detectors A and B.

Turning to FIG. 3*c*, LED 14*b* emits red light (635 nM typical) and LED 14*a* yellow light (583 nM typical). The LEDs are high intensity (80 mCd min), and are tightly focused (12 degrees = ½ power). Detectors A and B can be silicon phototransistors, saturating at 250 uW/cm$^2$ at 930 nM light. The spectral response of the typical sublimation yellow, magenta and cyan dyes are also shown. A threshold signal amplitude level produced by the photodetectors A and B can readily be selected to distinguish between logic "1" and logic "0" as will be explained.

The following table can be interpreted with reference to FIG. 3*c*.

| DYE FRAME | YELLOW LED (14a) | LOGIC LEVEL | RED LED (14b) | LOGIC LEVEL |
|---|---|---|---|---|
| Cyan | Blocked | 0 | Blocked | 0 |
| Magenta | Blocked | 0 | Transmits | 1 |
| Yellow | Transmits | 1 | Transmits | 1 |
| Black (Leader) | Blocked | 0 | Blocked | 0 |

When illuminated so as to produce a signal level above the selected threshold level, a photodetector will be considered to provide a logic 1. Below this level it provides logic 0. Therefore as shown, photodetector A will produce a signal level above the threshold level (logic 1) and photodetector B will produce a signal level above the threshold level (logic 1) when a yellow dye frame is disposed adjacent to the photodetectors A and B. When a cyan dye frame is disposed over the photodetectors A and B, they each produce signals having levels below the threshold level (logic 0). As shown in FIG. 1, the output of each photodetector is provided to an amplifier 17*a*. The amplifier 17*a* drives a threshold detector 17*b* which provides a logic "1" to a microcomputer 17 if the signal produced by its photodetector is above the threshold level (see FIG. 3*c*) and a logic "0" if it is below the threshold level. The microcomputer 17 in accordance with an algorithm embodied in a stored program determines the color of the dye frame above the detectors. The logic pattern 0,0 for the black leader portion is also shown. The logic pattern are also used by the microcomputer 17 to control the state of the printing cycle of a dye image. Although the detectors A and B are shown a distance downstream of the print head, this is only for clarity of illustration and they can be disposed quite close to the print head.

At the end of every printing cycle, or when new donor is supplied, the detectors A and B should be covered by the leader portion or by a portion of a cyan dye frame (logic 0,0). When a print command is given by an operator to the microcomputer 17, the carrier is advanced until both detectors identify a yellow dye frame (logic 1,1). The print head 18 is now ready to print a yellow image. At the end of printing the yellow image, the carrier 14 is advanced until the logic state 0,1 is detected. This indicates that a magenta dye frame is adjacent to the photodetectors A and B. After a magenta image is printed, the carrier is advanced until both LEDs 14*a* and 14*b* are covered by the leading edge of a cyan dye frame. That is logic 0,0. After a cyan image is printed, the carrier is not advanced and the detectors A and B remain covered by the trailing edge portion of the cyan dye frame until a new printing cycle is initiated. If the apparatus should lose electrical power at this point or be turned off, when power is restored, it need only verify that the logic pattern is 0,0 and begin a new print cycle.

With yellow and red LED detection, logic is used by the microcomputer 17 to control carrier web advance after each dye transfer and on power-down and power-up with a minimum wastage of carrier. Although the detectors A and B are shown located downstream past the print head, but it will be understood that they also can be disposed upstream of the print head, preferably at a distance equal to the length of a single dye frame.

Figure 3B:
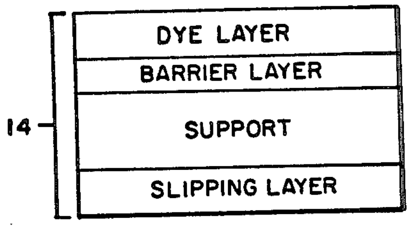
FIG. 3*b* shows a cross section of the carrier shown in FIG. 3*a;*

FIG. 3*b* shows in cross-section the carrier 14. As shown, the carrier 14 includes a support. On one surface of the support is a slipping layer which bears against the heating elements of the print head 18. On the other surface of the support is a barrier layer. On the barrier layer is the dye layer. Heat from the heating element passes through the slipping, support and barrier layers to the dye layer. The dye is sublimed from this layer into a receiver member 12 shown in FIG. 1.

Figure 2:
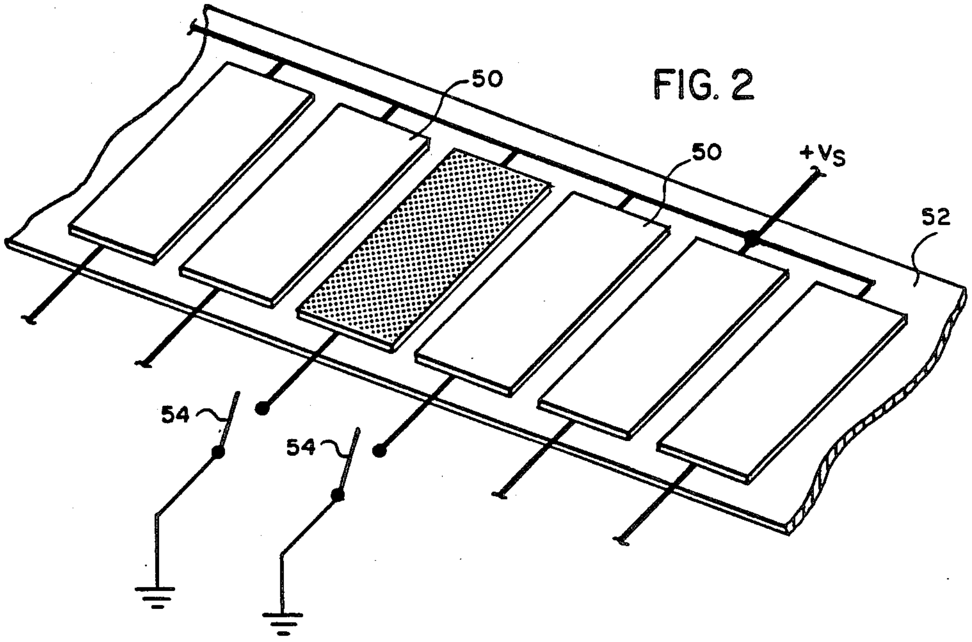
FIG. 2 is a perspective of several heating elements used in the print head of the apparatus of FIG. 1.

Referring to FIG. 1, the receiver member 12 is in the form of a sheet and is secured to a rotatable drum 16 which is mechanically coupled to a drive mechanism 15. The drive mechanism 15 continuously advances the drum 16 and receiver sheet 12 along a path past a stationary print head 18 during a cycle for addressing heating elements of the print head. Print head 18 has a plurality of heating elements 50, several of which are shown in FIG. 2, which press against the slipping layer of the carrier member 14 and force the carrier member against the receiver member 12. The carrier member 14 is driven along a path from a supply spool 20 onto a take-up spool 22 by a drive mechanism 23 coupled to the take-up spool 22. The drive mechanisms 15 and 23 each include motors which respectively continuously advance the carrier 14 and the receiver 12 relative to the heating elements 50 of the print head 18 as the heating elements are selectively energized.

The heating elements are shown schematically in FIG. 2. When a switch 54 is closed, a heating element 50 is connected to a potential source $V_S$. The microcomputer 17 controls the timing of the energization of the heating elements. During printing, as the members 12 and 14 are moved, dye image pixels are formed in the receiver member 12. As noted above, these members are moved continuously along paths relative to the print head during the printing operation. The microcomputer 17 controls the operation of the mechanisms 15 and 23.

The carrier member 14 is as noted above is formed with a repeating series of thermally transferable dye frames. Each series includes frames of yellow, magenta and cyan dye frames. The sequence of yellow, magenta and cyan is repeated. A single series is used to print one colored image in the receiver member 12. In the disclosure, the term dye refers to a colored material which transfers from the carrier to a receiver in response to energy applied by the individual heating elements of the print head 18.

Figure 4:
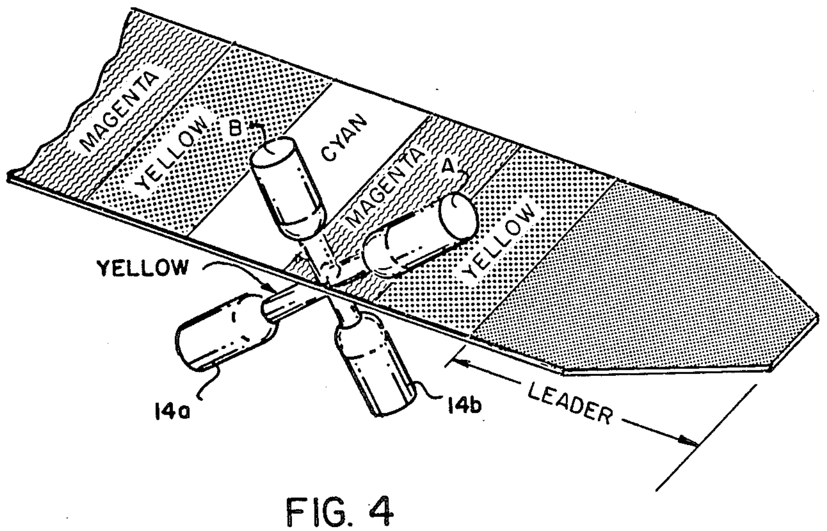
FIG. 4 shows another embodiment where yellow and red LEDs illuminate the same spot on the edge of a moving carrier.

In the space saving embodiment of FIG. 4, LEDs 14*a* and 14*b* are shown to illuminate the same spot on a carrier adjacent to an edge of the carrier. The yellow and red light pass through dye frames of the moving carrier and respectively illuminate their corresponding photodetectors A and B. All the other elements of the apparatus can be identical to that shown in FIG. 1. This arrangement further minimizes carrier wastage.

This invention has been described in detail with particular reference to certain preferred embodiments thereof, but it will be understood that variations and modifications can be effected within the spirit and scope of the invention.

I claim:

1. In a thermal printer system including a printer which uses a carrier with a repeating series of spaced yellow, magenta and cyan dye frames, and a receiver which receives dye from the yellow, magenta and cyan dye frames of a series to form a colored image, such printer including a print head having a plurality of selectively energizable heating elements, means for moving the carrier and the receiver along respective paths so as to sequentially move each dye frame of a series and the receiver relative to the print head such that as the heating elements are selectively energized, dye from each dye frame of a series is transferred to the receiver and forms a colored image in the receiver, means for identifying dye frames of such series comprising:

(a) a red LED disposed adjacent to the carrier path for illuminating the carrier with red light;

(b) a yellow LED disposed adjacent to the carrier path for illuminating the same dye frame of the carrier illuminated by red light with yellow light;

(c) first and second spaced photodetectors disposed adjacent to the carrier path and respectively responsive to the intensity of yellow and red light which passes through the dye frames for respectively providing electrical signals, the levels of such signals being a function of the intensity of source light which passes through a dye frame;

(d) said first photodetector producing a signal level above a threshold level when illuminated by yellow light passing through a yellow dye frame and below such threshold level when illuminated by yellow light passing through a cyan or magenta dye frame, said second photodetector producing a signal level above the threshold level when illuminated by red light passing through a yellow or a magenta dye frame and below such threshold level when illuminated by red light passing through cyan dye frames; and (e) means responsive to the threshold levels such first and second photodetector for identifying the particular dye frame being illuminated by the red and yellow light sources.

2. The invention as set forth in claim 1, wherein said electrical signals responsive means includes a threshold detector connected to each photodetector for providing logic signals representing whether or not an electrical signal is above the threshold level, and computing means responsive to said logic signals for identifying the illuminated dye frame of a series.

3. The invention as set forth in claim 2, wherein red and yellow light from the red and yellow LED's illuminate the same spot on the carrier adjacent to an edge of the carrier.

* * * * *